United States Patent
Wu

(10) Patent No.: US 9,814,012 B2
(45) Date of Patent: Nov. 7, 2017

(54) METHOD, NODE AND SYSTEM FOR MANAGING RESOURCES OF MACHINE TYPE COMMUNICATION APPLICATION

(71) Applicant: ZTE CORPORATION, Shenzhen, Guangdong Province (CN)

(72) Inventor: Hao Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/037,477

(22) PCT Filed: May 16, 2014

(86) PCT No.: PCT/CN2014/077673
§ 371 (c)(1),
(2) Date: May 18, 2016

(87) PCT Pub. No.: WO2014/183668
PCT Pub. Date: Nov. 20, 2014

(65) Prior Publication Data
US 2016/0286516 A1    Sep. 29, 2016

(30) Foreign Application Priority Data
Nov. 26, 2013   (CN) .......................... 2013 1 0611319

(51) Int. Cl.
*H04W 60/04*     (2009.01)
*H04W 4/00*      (2009.01)

(52) U.S. Cl.
CPC .......... *H04W 60/04* (2013.01); *H04W 4/005* (2013.01)

(58) Field of Classification Search
CPC ....... H04W 4/005; H04W 4/14; H04W 12/06; H04W 12/08; H04W 60/00; H04W 28/16
See application file for complete search history.

(56) References Cited

U.S. PATENT DOCUMENTS

2013/0183969 A1    7/2013   Kang et al.
2015/0245205 A1*   8/2015   Kim ..................... H04W 72/10
                                                 726/4
(Continued)

FOREIGN PATENT DOCUMENTS

CN    101902681 A    12/2010
CN    102378162 A     3/2012
(Continued)

OTHER PUBLICATIONS

European Search Report issued Oct. 26, 2016 for EP Application No. 14797721.9.
(Continued)

*Primary Examiner* — Liton Miah
(74) *Attorney, Agent, or Firm* — Plumsea Law Group, LLC

(57) ABSTRACT

A resource management method of a machine type communication application is disclosed. The method includes: a machine-to-machine (M2M) application sending a registration request updating message which carries remote registration parameters of the M2M application to a local common service entity (CSE); the local CSE receiving the registration updating request message and managing remote registration of the M2M application according to an instruction of the remote registration parameters; and the local CSE returning a registration updating response to the M2M application. The embodiments of the present document also provide an M2M node and a resource management system of the machine type communication application.

14 Claims, 2 Drawing Sheets

(56) References Cited

U.S. PATENT DOCUMENTS

| | | | | |
|---|---|---|---|---|
| 2015/0281330 A1* | 10/2015 | Huang | ................... | H04L 51/12 |
| | | | | 709/203 |
| 2015/0296470 A1* | 10/2015 | Kim | ..................... | H04L 41/082 |
| | | | | 455/435.2 |
| 2015/0305008 A1* | 10/2015 | Kim | ................. | H04W 72/0406 |
| | | | | 370/329 |

FOREIGN PATENT DOCUMENTS

| | | | |
|---|---|---|---|
| EP | 3057281 | A1 | 8/2016 |
| WO | 2013038353 | A2 | 3/2013 |
| WO | 2013121362 | A2 | 8/2013 |
| WO | 2013136243 | A2 | 9/2013 |
| WO | 2014183668 | A1 | 11/2014 |

OTHER PUBLICATIONS

International Search Report dated Sep. 4, 2014 in PCT Patent Application No. PCT/CN2014/077673.
Written Opinion dated Sep. 4, 2014 in PCT Patent Application No. PCT/CN2014/077673.

\* cited by examiner

METHOD, NODE AND SYSTEM FOR MANAGING RESOURCES OF MACHINE TYPE COMMUNICATION APPLICATION

CROSS-REFERENCE TO RELATED APPLICATION(S)

This application is the U.S. National Phase application of PCT application number PCT/CN2014/077673 having a PCT filing date of May 16, 2014, which claims priority of Chinese patent application 201310611319.3 filed on Nov. 26, 2013, the disclosures of which are hereby incorporated by reference.

TECHNICAL FIELD

The present document relates to the field of the terminal communication technology, and in particular, to a resource management method, a node and a system of a machine type communication (MTC) application.

BACKGROUND OF RELATED ART

The machine-to-machine (M2M) communication network is composed of M2M nodes and a bearer network. The M2M nodes communicate with each other through the bearer network, and one M2M node contains at least one application or one common service entity. The M2M nodes can be divided into the following three types according to different functions:

an application node: which must have at least one application and does not contain a common service entity (CSE);

an intermediate node: which must have at least one common service entity and may have at least one application;

a basis node: which must have at least one common service entity and at least one application.

As shown in FIG. 1, the communication among the M2M applications is achieved through the interaction among the common service entities (CSEs), the M2M application is connected to the CSE through an X interface, and the CSEs communicate with each other through a Y interface. The premise of the communication among the M2M applications is that the M2M applications first need to be registered in the local CSE, and then the interaction among the M2M applications can just be achieved through the communication between the CSEs.

In the traditional M2M service, it is always a single application to perform communication, for example, in the smart meter service managed by the power grid corporation, it is only required that the application in the smart meter of the terminal interacts with the application in the server managed by the power grid corporation. However, with the expansion of the M2M service, the interaction might be required among different applications, for example, the intelligent home appliances, except enjoying the online fault diagnosis maintenance service of the intelligent home appliances provided by the intelligent appliance company, further can enjoy the online movie service provided by other audio video service providers.

In the implementation process of the multi-application interaction, different applications may belong to different service providers, and generally the M2M applications are directly registered to the local CSE (corresponding to one service provider) and managed by the local CSE, therefore, in order to support the M2M applications to interact with multiple applications, a new resource management method of the M2M applications is required.

SUMMARY

A resource management method, node and system of a machine type communication application provided by the present document can provide resources to support remote application interaction of a machine-to-machine (M2M) application.

The present document provides a resource management method of a machine type communication application, comprising:

a machine-to-machine (M2M) application sending a registration updating request message to a local common service entity (CSE), wherein the registration updating request message carries remote registration parameters of the M2M application;

the local CSE receiving the registration updating request message and managing remote registration of the M2M application according to an instruction of the remote registration parameters; and the local CSE returning a registration updating response to the M2M application.

Alternatively, the method further comprises the following features:

the remote registration parameters comprise a remote registration list, and the remote registration list comprises an identifier of a remote CSE to which the M2M application is to be registered.

Alternatively, the method further comprises the following features:

the local CSE managing remote registration of the M2M application according to an instruction of the remote registration parameters comprises:

the local CSE comparing the remote registration list with a registered remote CSE list of the M2M application stored locally, judging whether there is an identifier of a remote CSE which does not appear in the registered remote CSE list in the remote registration list; if yes, sending a remote registration request to the remote CSE, registering the M2M application to the remote CSE, and adding an identifier of the remote CSE to which the M2M application is successfully registered into the registered remote CSE list; and judging whether there is an identifier of a remote CSE which does not appear in the remote registration list in the registered remote CSE list; if yes, sending a remote unregistration request to the remote CSE, un-registering the M2M application from the remote CSE, and deleting an identifier of the remote CSE from which the M2M application is successfully un-registered from the registered remote CSE list; and wherein, identifiers of all remote CSEs to which the M2M application is successfully registered are recorded in the registered remote CSE.

Alternatively, the method further comprises the following features:

the remote registration parameters further comprise an activation indication parameter, wherein, a value of the activation indication parameter is "true" or "false";

the local CSE managing remote registration of the M2M application according to an instruction of the remote registration parameters further comprises:

if the activation indication parameter is "true", the local CSE setting a remote registration property of the M2M application as "active" and storing the remote registration property; and if the activation indication parameter is "false", the local CSE setting the remote registration property of the M2M application as "de-active" and storing the remote registration property.

Alternatively, the method further comprises the following features:

the registration updating response carries an updated registered remote CSE identifier list of the M2M application.

The present document further provides a machine to machine (M2M) node, comprising: a common service entity (CSE), wherein the CSE comprises:

a message receiving module, configured to: receive a registration updating request message sent by a machine to machine (M2M) application, wherein, the registration request updating message carries remote registration parameters of the M2M application;

a registration management module, configured to: manage remote registration of the M2M application according to an instruction of the remote registration parameters; and a response sending module, configured to return a registration updating response to the M2M application.

Alternatively, the M2M node further comprises the following features:

the remote registration parameters comprise a remote registration list, wherein the remote registration list comprises an identifier of a remote CSE to which the M2M application is to be registered.

Alternatively, the M2M node further comprises the following features:

the registration management module comprises a registration unit;

the registration unit is configured to compare the remote registration list with a registered remote CSE list of the M2M application stored locally, and judge whether there is an identifier of a remote CSE which does not appear in the registered remote CSE list in the remote registration list; if yes, send a remote registration request to the remote CSE, register the M2M application to the remote CSE, and add an identifier of the remote CSE to which the M2M application is successfully registered into the registered remote CSE list; and judge whether there is an identifier of a remote CSE which does not appear in the remote registration list in the registered remote CSE list; if yes, send a remote un-registration request to the remote CSE, un-register the M2M application from the remote CSE, and delete an identifier of the remote CSE from which the M2M application is successfully un-registered from the registered remote CSE list; and wherein, identifiers of all remote CSEs to which the M2M application is registered successfully are recorded in the registered remote CSE list.

Alternatively, the M2M node further comprises the following features:

the registration management module further comprises a property management unit;

the property management unit is configured to: if an activation indication parameter in received remote registration parameters is "true", set a remote registration property of the M2M application as "active" and store the remote registration property; if the activation indication parameter in the received remote registration parameters is "false", set the remote registration property of the M2M application as "de-active" and store the remote registration property; and wherein, the remote registration parameters further comprise an activation indication parameter, wherein a value of the activation indication parameter is "true" or "false".

Alternatively, the M2M node further comprises the following features:

the registration updating response carries an updated registered remote CSE identifier list of the M2M application.

The present document further provides a machine to machine (M2M) node, comprising: an M2M application, wherein the M2M application comprises:

a message sending module, configured to: send a registration updating request message to a local common service entity (CSE), wherein the registration updating request message carries remote registration parameters of the M2M application; and a response receiving module, configured to receive a registration updating response of the local CSE.

Alternatively, the M2M node further comprises the following features:

the remote registration parameters comprise a remote registration list, wherein the remote registration list comprises an identifier of a remote CSE to which the M2M application is to be registered.

Alternatively, the M2M node further comprises the following features:

the remote registration parameters further comprise an activation indication parameter, wherein a value of the activation indication parameter is "true" or "false";

if the activation indication parameter is "true", the local CSE sets a remote registration property of the M2M application as "active" and stores the remote registration property; and if the activation indication parameter is "false", the local CSE sets the remote registration property of the M2M application as "de-active" and stores the remote registration property.

The present document further provides a resource management system of a machine type communication application, comprising: an above machine to machine (M2M) node comprising an M2M application and an above M2M node comprising a local common service entity (CSE).

The present document further provides a resource management method of a machine type communication application, comprising:

a common service entity (CSE) receiving a registration updating request message sent by a machine to machine (M2M) application, wherein, the registration updating request message carries remote registration parameters of the M2M application;

managing remote registration of the M2M application according to an instruction of the remote registration parameters; and returning a registration updating response to the M2M application.

Alternatively, the method further comprises the following features:

the remote registration parameters comprise a remote registration list, wherein the remote registration list comprises an identifier of a remote CSE to which the M2M application is to be registered.

Alternatively, the method further comprises the following features:

managing remote registration of the M2M application according to an instruction of the remote registration parameters comprises:

comparing the remote registration list with a registered remote CSE list of the M2M application stored locally;

judging whether there is an identifier of a remote CSE which does not appear in the registered remote CSE list in the remote registration list; if yes, sending a remote registration request to the remote CSE, registering the M2M application to the remote CSE, and adding an identifier of the remote CSE to which the application is successfully registered into the registered remote CSE list; and judging whether there is an identifier of a remote CSE which does not appear in the remote registration list in the registered remote CSE list; if yes, sending a remote un-registration request to the remote CSE, un-registering the M2M application from the remote CSE, and deleting an identifier of the remote CSE from which the M2M application is successfully un-registered from the registered remote CSE list; and wherein, identifiers of all remote CSEs to which the M2M application which is registered successfully are recorded in the registered remote CSE list.

Alternatively, the method further comprises the following features:

the remote registration parameters further comprise an activation indication parameter, wherein a value of the activation indication parameter is "true" or "false";

said managing remote registration of the M2M application according to an instruction of the remote registration parameters further comprises:

if the activation indication parameter in received remote registration parameter is "true", setting a remote registration property of the M2M application as "active" and storing the remote registration property; and if the activation indication parameter in the received remote registration parameters is "false", setting the remote registration property of the M2M application as "de-active" and storing the remote registration property.

Alternatively, the method further comprises the following features:

the registration updating response carries an updated registered remote CSE identifier list of the M2M application.

The present document further provides a resource management method of a machine type communication application, comprising:

a machine-to-machine (M2M) application sending a registration updating request message to a local common service entity (CSE) wherein the registration updating request message carries remote registration parameters of the M2M application; and receiving a registration updating response of the local CSE.

Alternatively, the method further comprises the following features:

the remote registration parameters comprise a remote registration list, wherein the remote registration list comprises an identifier of a remote CSE to which the M2M application is to be registered.

Alternatively, the method further comprises the following features:

the remote registration parameters further comprise an activation indication parameter, wherein a value of the activation indication parameter is "true" or "false";

if the activation indication parameter is "true", the local CSE sets a remote registration property of the M2M application as "active" and stores the remote registration property; and if the activation indication parameter is "false", the local CSE sets the remote registration property of the M2M application as "de-active" and stores the remote registration property.

Compared with the related art, in the resource management method, node and system of the machine type communication application provided by the embodiment of the present document, the M2M application sends to the local CSE the registration updating request message carrying the remote registration parameters, the local CSE manages the remote registration of the M2M application according to the instruction of the remote registration parameters, and returns the registration updating response to the M2M application, which can provide resources to support the remote application interaction of the M2M application.

PREFERRED EMBODIMENTS

The embodiments of the present document are described in details with reference to the accompanying drawings hereinafter. It should be illustrated that, in the case of not conflicting, the embodiments in the present application and features in these embodiments can be combined with each other.

Figure 1:
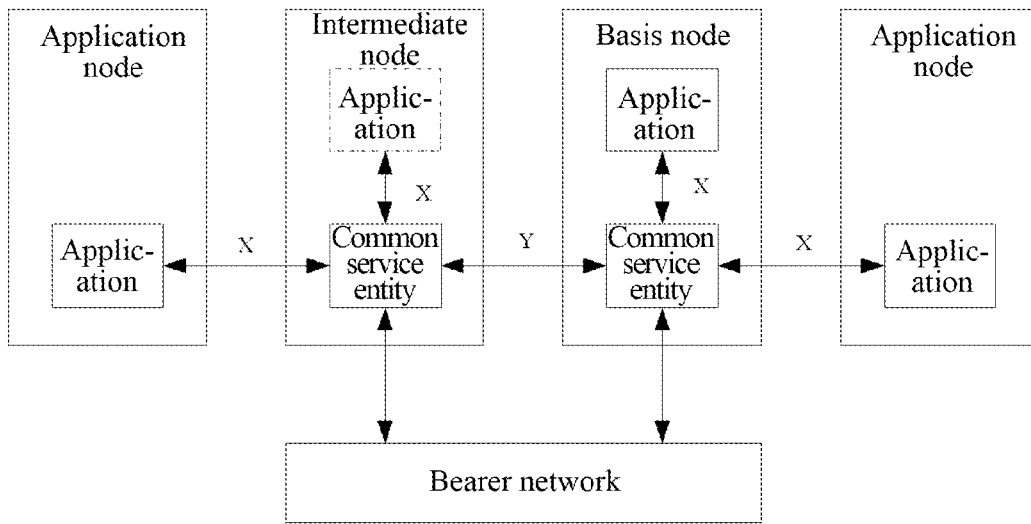
FIG. 1 is a system of interaction machine type communication applications in the related art.
Figure 2:
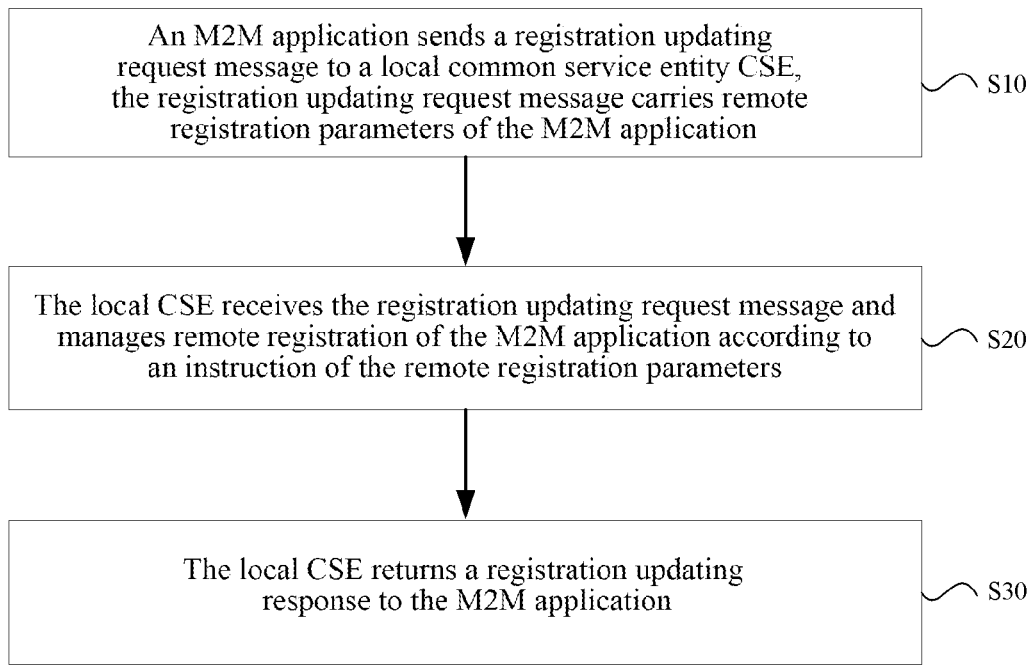
FIG. 2 is a flow chart of a resource management method of a machine type communication application according to an embodiment of the present document.

As shown in FIG. 2, the embodiment of the present document provides a resource management method of a machine type communication application, and the method includes the following steps.

In S10, a machine-to-machine (M2M) application sends a registration updating request message to a local common service entity (CSE), wherein the registration updating request message carries remote registration parameters of the M2M application.

In S20, the local CSE receives the registration updating request message and manages remote registration of the M2M application according to an instruction of the remote registration parameters.

In S30, the local CSE returns a registration updating response to the M2M application.

The method can further include the following features:

wherein, the registration updating request message is a signaling used for updating registration information on the CSE by the M2M application in the related art, used to update a property of the resources created for the M2M application on the CSE. For example, when every resource is created, a validity period will be set, if the application needs to extend the validity period, it can send a registration updating request message carrying a new validity period to the CSE, and the CSE will replace the property value of the validity period of the application in local according to the new validity period in the registration updating request message. The embodiment of the present document extends the field of the registration updating request message, and adds a "remote registration parameter" field therein, to support the remote registration of the M2M application.

Wherein, the local CSE refers to the CSE directly registered by the M2M application, and the remote CSE is another CSE except the local CSE registered by the M2M application.

Preferably, the remote registration parameters comprise a remote registration list, which comprises an identifier of a remote CSE to which the M2M application is expected to be registered.

Preferably, the local CSE managing remote registration of the M2M application according to an instruction of the remote registration parameter includes that:

the local CSE compares the remote registration list with a registered remote CSE list of the M2M application stored locally, judges whether there is an identifier of a remote CSE which does not appear in the registered remote CSE list; if yes, sends a remote registration request to the remote CSE, registers the M2M application to the remote CSE, and adds the identifier of the remote CSE to which the application is successfully registered into the registered remote CSE list; and judges whether there is an identifier of a remote CSE which does not appear in the remote registration list in the registered remote CSE list; if yes, sends a remote un-registration request to the remote CSE, un-registers the M2M application from the remote CSE, and deletes the identifier of the remote CSE from which the application is successfully un-registered from the registered remote CSE list; and wherein, identifiers of all remote CSEs to which the M2M application is successfully registered are recorded in the registered remote CSE list.

Wherein, after the local CSE of the M2M application sends the remote registration request to the remote CSE, the remote CSE creates the remote registration resources for the M2M application, and sends the remote registration request response message to the local CSE of the M2M application.

If the M2M application A wants to provide a service for the M2M application B, for example, the application A is a video service provider, and the application B is an intelligence home appliance, but the application B and the application A are not in a same CSE, then the application A needs to remotely register to the local CSE of the application B, and the application A can send the application data to the application B after the registration is successful;

if the application A wants to visit the application B, for example, the application B is a smart meter, and the application A wants to read the data of the application B, but the application B and the application A are not in a same CSE, then the application A needs to remotely register to the local CSE of the application B, and the application A can read the data, on the local CSE, of the application B after the registration is successful;

if the two applications (the application A and the application B) want to achieve the exchange of visits, the application A and the application B are respectively registered (remotely registered) to the local CSE of the opposite side.

Preferably, before the application A sends the application data to the application B or the application A reads the application data from the application B, the application A first judges whether the application B and the application A itself are on the same local CSE; if not, the application A queries the registered remote CSE list on the local CSE. If the local CSE of the application B is in the list, then the application A can send the application data to the application B or the application A can read the application data from the application B.

Preferably, the remote registration parameters further include an activation indication parameter, of which a value is "true" or "false";

the local CSE managing remote registration of the M2M application according to an instruction of the remote registration parameters further includes that: if the activation indication parameter is "true", then the local CSE sets a remote registration property of the M2M application as "active" and stores it; if the activation indication parameter is "false", then the local CSE sets a remote registration property of the M2M application as "de-active" and stores it.

Preferably, before the application A sends the application data to the application B or the application A reads the application data from the application B, the application A first judges whether the application B and the application A itself are on the same local CSE; if not, the application queries the remote registration property on the local CSE; if the remote registration property is " active", then the application A queries the registered remote CSE list on the local CSE. If the local CSE of the application B is in the list, then the application A can send the application data to the application B or the application A can read the application data from the application B. If the remote registration property is "de-active", the application A is not able to send the application data to the application B or the application A cannot read the application data from the application B.

Preferably, when the local CSE returns the registration updating response to the M2M application, the registration updating response carries an updated registered remote CSE identifier list of the M2M application. That is, the M2M application can check whether there is a situation of registration/un-registration failure according to the information of the registered remote CSE fed back by the local CSE; if yes, then the corresponding process is performed, for example, to re-initiate the registration updating request.

Figure 3:
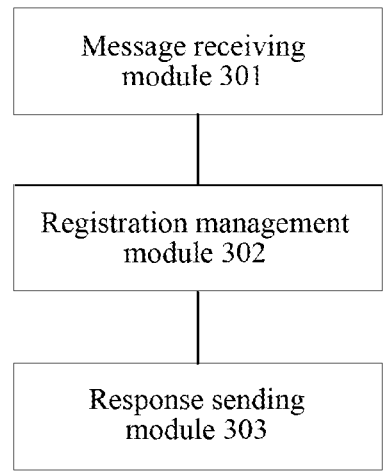
FIG. 3 is a structure schematic diagram of an M2M node (including an M2M application) according to an embodiment of the present document.

As shown in FIG. 3, the embodiment of the present document also provides a machine to machine (M2M) node, wherein, the M2M node includes a common service entity (CSE), and the CSE includes that:

a message receiving module 301, is configured to: receive a registration updating request message sent by a machine to machine (M2M) application, wherein, the registration updating request message carries remote registration parameters of the M2M application;

a registration management module 302, is configured to: manage remote registration of the M2M application according to an instruction of the remote registration parameters; and a response sending module 303, is configured to return a registration updating response to the M2M application.

The node can further include the following features:

Preferably, the remote registration parameters comprise a remote registration list, which comprises an identifier of a remote CSE to which the M2M application is to be registered.

The registration management module comprises a registration unit;

the registration unit is configured to compare the remote registration list with a registered remote CSE list of the M2M application stored locally, and judge whether there is a remote CSE identifier which does not appear in the registered remote CSE list in the remote registration list; if yes, send a remote registration request to the remote CSE, register the M2M application to the remote CSE, and add an identifier of the remote CSE to which the M2M application is successfully registered into the registered remote CSE list; and judge whether there an identifier of a remote CSE which does not appear in the remote registration list in the registered remote CSE list; if yes, send a remote un-registration request to the remote CSE, to un-register the M2M application from the remote CSE, and delete the identifier of the remote CSE from which the M2M application is successfully un-registered from the registered remote CSE list;

wherein, identifiers of all remote CSEs to which the M2M application is successfully registered are recorded in the registered remote CSE list.

The registration management module further comprises a property management unit;

the property management unit is configured to: if an activation indication parameter in a received remote registration parameter is "true", then set a remote registration property of the M2M application as "active" and store it; and if the activation indication parameter in the received remote registration parameters is "false", then set the remote registration property of the M2M application as "de-active" and store it;

wherein, the remote registration parameters further includes an activation indication parameter whose value is "true" or "false".

Preferably, the registration updating response carries an updated registered remote CSE identifier list of the M2M application.

Figure 4:
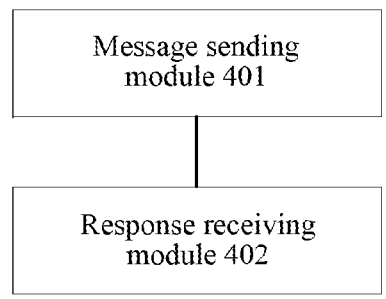
FIG. 4 is a structure schematic diagram of an M2M node (including a CSE) according to an embodiment of the present document.

As shown in FIG. 4, the embodiment of the present document also provides an M2M node, wherein, the M2M node includes an M2M application, and the M2M application includes:

a message sending module 401, configured to: send a registration updating request message carrying remote registration parameters of the M2M application to a local common service entity (CSE);

a response receiving module 402, configured to receive a registration updating response of the local CSE.

The node can further include the following features:

Preferably, the remote registration parameters comprise a remote registration list, which comprises an identifier of a remote CSE to which the M2M application is to be registered.

Preferably, the remote registration parameters further include an activation indication parameter, whose value is "true" or "false"; if the activation indication parameter is "true", then the local CSE sets a remote registration property of the M2M application as "active" and stores it; if the activation indication parameter is "false", then the local CSE sets a remote registration property of the M2M application as "de-active" and stores it.

Preferably, the registration updating response carries an updated registered remote CSE identifier list of the M2M application. That is, the M2M application can check whether there is a situation of registration/un-registration failure according to the information of the registered remote CSE fed back by the local CSE; if yes, then the corresponding process is performed, for example, to re-initiate the registration updating request.

Figure 5:
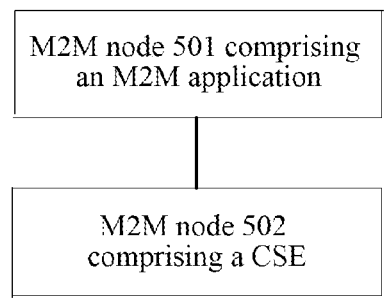
FIG. 5 is a structure schematic diagram of a system for realizing interaction of machine type communication applications according to an embodiment of the present document.

The embodiment of the present document also provides a system for realizing the interaction of the machine type communication applications, as shown in FIG. 5, including the above M2M node 501 which comprises the M2M application and the above M2M node which comprises the CSE 502.

In the resource management method, node and system of the machine type communication application provided by the above embodiment, the M2M application sends to the local CSE the registration updating request message carrying the remote registration parameters, the local CSE manages the remote registration of the M2M application according to the instruction of the remote registration parameters, and returns the registration updating response to the M2M application, which can provide resources to support the remote application interaction of the M2M application.

It can be understood by those skilled in the art that all or part of steps in the above-mentioned methods can be fulfilled by programs instructing the relevant hardware, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

It should be illustrated that the present document can have a variety of other embodiments. Those skilled in the art can make the corresponding modifications and variations according to the present document without departing from the rule and essence of the present document. And all of these modifications or the variations should fall within the scope of the appending claims of the present document.

INDUSTRIAL APPLICABILITY

The resource management method, node and system of the machine type communication application provided by the embodiment of the present document can provide resources to support the remote application interaction of the M2M applications.

What is claimed is:

1. A resource management method of a machine type communication application, comprising:
   a machine-to-machine (M2M) application sending a registration updating request message to a local common service entity (CSE), wherein the registration updating request message carries remote registration parameters of the M2M application;
   the local CSE receiving the registration updating request message and managing remote registration of the M2M application according to an instruction of the remote registration parameters; and
   the local CSE returning a registration updating response to the M2M application; wherein,
   the remote registration parameters comprise a remote registration list, wherein the remote registration list comprises an identifier of a remote CSE to which the M2M application is to be registered; wherein, the local CSE managing remote registration of the M2M application according to an instruction of the remote registration parameters comprises:

the local CSE comparing the remote registration list with a registered remote CSE list of the M2M application stored locally, judging whether there is an identifier of a remote CSE which does not appear in the registered remote CSE list in the remote registration list; if yes, sending a remote registration request to the remote CSE, registering the M2M application to the remote CSE, and adding an identifier of the remote CSE to which the application is successfully registered into the registered remote CSE list; and judging whether there is an identifier of a remote CSE which does not appear in the remote registration list in the registered remote list; if yes, sending a remote un-registration request to the remote CSE, un-registering the M2M application from the remote CSE, and deleting an identifier of the remote CSE from which the M2M application is successfully un-registered from the registered remote CSE list;

wherein, identifiers of all remote CSEs to which the M2M application is successfully registered are recorded in the registered remote CSE list.

2. The method according to claim 1, wherein, the remote registration parameters further comprise an activation indication parameter, wherein a value of the activation indication parameter is "true" or "false";

the local CSE managing remote registration of the M2M application according to an instruction of the remote registration parameters further comprises:

if the activation indication parameter is "true", the local CSE setting a remote registration property of the M2M application as "active" and storing the remote registration property; and if the activation indication parameter is "false", the local CSE setting the remote registration property of the M2M application as "de-active" and storing the remote registration property.

3. The method according to claim 1, wherein, the registration updating response carries an updated registered remote CSE identifier list of the M2M application.

4. A machine to machine (M2M) node, comprising a common service entity (CSE), wherein the CSE comprises hardware performing instructions stored in a non-transitory computer readable medium which executes steps in following modules:

a message receiving module, configured to: receive a registration updating request message sent by a machine to machine (M2M) application, wherein, the registration updating request message carries remote registration parameters of the M2M application;

a registration management module, configured to: manage remote registration of the M2M application according to an instruction of the remote registration parameters; and a response sending module, configured to return a registration updating response to the M2M application; wherein, the remote registration parameters comprise a remote registration list, wherein the remote registration list comprises an identifier of a remote CSE to which the M2M application is to be registered; wherein, the registration management module comprises a registration unit;

the registration unit is configured to compare the remote registration list with a registered remote CSE list of the M2M application stored locally, and judge whether there is an identifier of a remote CES which does not appear in the registered remote CSE list in the remote registration list; if yes, send a remote registration request to the remote CSE, register the M2M application to the remote CSE, and add an identifier of the remote CSE to which the M2M application is successfully registered into the registered remote CSE list; and judge whether there is an identifier of a remote CSE which does not appear in the remote registration list in the registered remote CSE list; if yes, send a remote un-registration request to the remote CSE, un-register the M2M application from the remote CSE, and delete an identifier of the remote CSE from which the M2M application is successfully un-registered from the registered remote CSE list;

wherein, identifiers of all remote CSEs to which the M2M application is successfully registered are recorded in the registered remote CSE list.

5. The M2M node according to claim 4, wherein, the registration management module further comprises a property management unit;

the property management unit is configured to: if an activation indication parameter in received remote registration parameters is "true", set a remote registration property of the M2M application as "active" and store the remote registration property; if the activation indication parameter in the received remote registration parameters is "false", set the remote registration property of the M2M application as "de-active" and store the remote registration property; and wherein, the remote registration parameters comprise an activation indication parameter, wherein a value of the activation indication parameter is "true" or "false".

6. The M2M node according to claim 4, wherein, the registration updating response carries an updated registered remote CSE identifier list of the M2M application.

7. A machine to machine (M2M) node, comprising: an M2M application, wherein the M2M application comprises hardware performing instructions stored in a non-transitory computer readable medium which executes steps in following modules:

a message sending module, configured to: send a registration updating request message to a local common service entity (CSE), wherein the registration updating request message carries remote registration parameters of the M2M application; and a response receiving module, configured to receive a registration updating response of the local CSE; wherein, the remote registration parameters comprise a remote registration list, wherein the remote registration list comprises an identifier of a remote CSE to which the M2M application is to be registered; wherein, the local CSE managing remote registration of the M2M application according to an instruction of the remote registration parameters comprises:

the local CSE comparing the remote registration list with a registered remote CSE list of the M2M application stored locally, judging whether there is an identifier of a remote CSE which does not appear in the registered remote CSE list in the remote registration list; if yes, sending a remote registration request to the remote CSE, registering the M2M application to the remote CSE, and adding an identifier of the remote CSE to which the application is successfully registered into the registered remote CSE list; and judging whether there is an identifier of a remote CSE which does not appear in the remote registration list in the registered remote list; if yes, sending a remote un-registration request to the remote CSE, un-registering the M2M application from the remote CSE, and deleting an identifier of the remote CSE from which the M2M application is successfully un-registered from the registered remote CSE list;

wherein, identifiers of all remote CSEs to which the M2M application is successfully registered are recorded in the registered remote CSE list.

8. The M2M node according to claim 7, wherein, the remote registration parameters comprise a remote registration list, wherein, the remote registration list comprises an identifier of a remote CSE to which the M2M application is to be registered, and wherein, the remote registration parameters further comprise an activation indication parameter, wherein a value of the activation indication parameter is "true" or "false";

if the activation indication parameter is "true", the local CSE sets a remote registration property of the M2M application as "active" and stores the remote registration property; and if the activation indication parameter is "false", the local CSE sets the remote registration property of the M2M application as "de-active" and stores the remote registration property.

9. A resource management system of a machine type communication application, comprising:

the machine to machine (M2M) node of claim 4, and the M2M node which comprises an M2M application, wherein the M2M application comprises: hardware performing instructions stored in a non-transitory computer readable medium which executes steps in following modules:

a message sending module, configured to: send a registration updating request message to a local common service entity (CSE), wherein the registration updating request message carries remote registration parameters of the M2M application; and a response receiving module, configured to receive a registration updating response of the local CSE.

10. A resource management method of a machine type communication application, comprising:

a common service entity receiving a registration updating request message sent by a machine to machine (M2M) application, wherein, the registration updating request message carries remote registration parameters of the M2M application;

managing remote registration of the M2M application according to an instruction of the remote registration parameters; and returning a registration updating response to the M2M application; wherein, the remote registration parameters comprise a remote registration list, wherein the remote registration list comprises an identifier of a remote CSE to which the M2M application is to be registered; wherein, said managing remote registration of the M2M application according to an instruction of the remote registration parameters comprises:

comparing the remote registration list with a registered remote CSE list of the M2M application stored locally;

judging whether there is an identifier of a remote CSE which does not appear in the registered remote CSE list in the remote registration list; if yes, sending a remote registration request to the remote CSE, registering the M2M application to the remote CSE, and adding an identifier of the remote CSE to which the M2M application is successfully registered into the registered remote CSE list; and judging whether there is an identifier of a remote CSE which does not appear in the remote registration list in the registered remote CSE list; if yes, sending a remote un-registration request to the remote CSE, un-registering the M2M application from the remote CSE, and deleting an identifier of the remote CSE from which the M2M application is successfully un-registered from the registered remote CSE list; and wherein, identifiers of all remote CSEs to which the M2M application is successfully registered are recorded in the registered remote CSE list.

11. The method according to claim 10, wherein, the remote registration parameters further comprise an activation indication parameter, wherein a value of the activation indication parameter is "true" or "false";

said managing remote registration of the M2M application according to an instruction of the remote registration parameters further comprises:

if the activation indication parameter in received remote registration parameters is "true", setting a remote registration property of the M2M application as "active" and storing the remote registration property; and if the activation indication parameter in the received remote registration parameter is "false", setting the remote registration property of the M2M application as "de-active" and storing the remote registration property.

12. The method according to claim 10, wherein, the registration updating response carries an updated registered remote CSE identifier list of the M2M application.

13. A resource management method of a machine type communication application, comprising:

a machine-to-machine (M2M) application sending a registration updating request message to a local common service entity (CSE), wherein the registration updating request message carries remote registration parameters of the M2M application; and receiving a registration updating response of the local CSE;

wherein, the remote registration parameters comprise a remote registration list, wherein the remote registration list comprises an identifier of a remote CSE to which the M2M application is to be registered; wherein, said managing remote registration of the M2M application according to an instruction of the remote registration parameters comprises:

comparing the remote registration list with a registered remote CSE list of the M2M application stored locally;

judging whether there is an identifier of a remote CSE which does not appear in the registered remote CSE list in the remote registration list; if yes, sending a remote registration request to the remote CSE, registering the M2M application to the remote CSE, and adding an identifier of the remote CSE to which the M2M application is successfully registered into the registered remote CSE list; and judging whether there is an identifier of a remote CSE which does not appear in the remote registration list in the registered remote CSE list; if yes, sending a remote un-registration request to the remote CSE, un-registering the M2M application from the remote CSE, and deleting an identifier of the remote CSE from which the M2M application is successfully un-registered from the registered remote CSE list; and wherein, identifiers of all remote CSEs to which the M2M application is successfully registered are recorded in the registered remote CSE list.

14. The method according to claim 13, wherein, the remote registration parameters comprise a remote registration list, wherein the remote registration list comprises an identifier of a remote CSE to which the M2M application is to be registered, and wherein, the remote registration parameters further comprise an activation indication parameter, wherein a value of the activation indication parameter is "true" or "false";

if the activation indication parameter is "true", the local CSE sets a remote registration property of the M2M application as "active" and stores the remote registration property; and if the activation indication parameter is "false", then the local CSE sets the remote registration property of the M2M application as "de-active" and stores the remote registration property.

\* \* \* \* \*